C. WHITE.
Assignor to B. B. & H. W. FRIEDENWALD.
FLUID EJECTOR.
No. 10,786. Reissued Nov. 30, 1886.
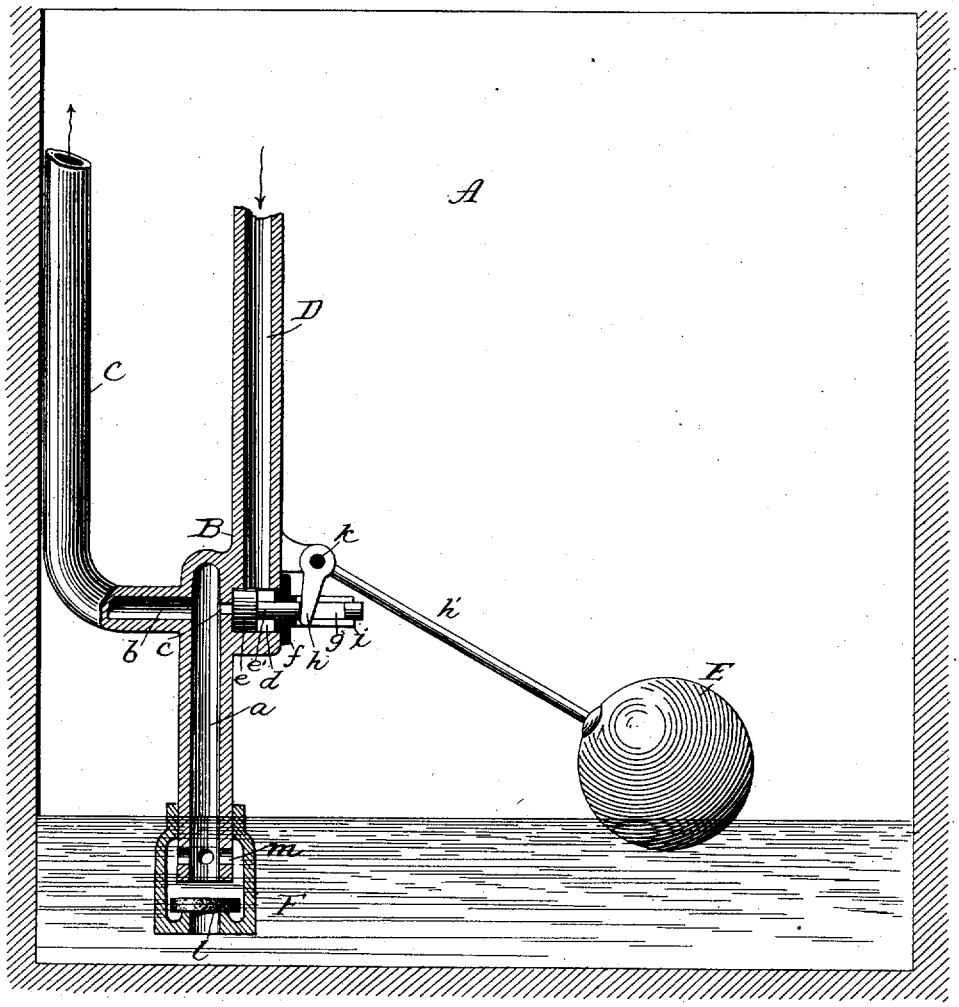
Attest:
Walter Donaldson
Frank L. Middleton
Inventor:
Charles White
by Ellis Spear
Atty
N. PETERS, Photo-Lithographer, Washington, D. C.

UNITED STATES PATENT OFFICE.

CHARLES WHITE, OF BALTIMORE, MARYLAND, ASSIGNOR TO BENJAMIN B. FRIEDENWALD AND HIRAM W. FRIEDENWALD, OF SAME PLACE.

FLUID-EJECTOR.

SPECIFICATION forming part of Reissued Letters Patent No. 10,786, dated November 30, 1886.

Original No. 346,878, dated August 3, 1886. Application for reissue filed August 19, 1886. Serial No. 211,330.

*To all whom it may concern:*

Be it known that I, CHARLES WHITE, a citizen of the United States, residing at Baltimore, in the State of Maryland, have invented certain new and useful Improvements in Fluid-Ejectors, of which the following is a specification, reference being had therein to the accompanying drawing.

My invention relates to fluid-ejectors and valve mechanism therefor, as illustrated in the accompanying drawing, in which the ejector is arranged in a well and shown in sections.

The letter A designates the well arranged to receive and hold the static water, which accumulates therein in sufficient quantity before the ejector B is put in operation, which continues to operate until the water has nearly all been ejected from the well.

The ejector B consists of an ingress-passage, *a*, for the static water, communicating with the port *b*, which is connected to the discharge-pipe C. Directly opposite and central to the port *b* is a small ingress-opening, *c*, through which the pressure-water passes from the pipe D, and as it crosses the passage *a* it acts on and ejects the static water from the well A by way of the discharge-pipe C.

In ejectors of this class, by which static water is elevated by a similar fluid under pressure, it is desirable that the pressure-water should be applied suddenly to give the static water momentum, and it is also desirable, when the ejector is used in a well that accumulates water slowly, to have it operate at intervals, or when sufficient water has accumulated in the well, to eject the same, and then remain inactive until again required. Therefore I arrange a valve of special construction, and attach a float thereto in such a manner that the above requirements are accomplished.

Concentric to the port *c* is formed a chamber, *d*, in which is fitted a piston-head, *e*, that forms a valve between the pressure-pipe D and the port *c*. From the head *e* projects a stem, *e'*, that extends to the outside of the chamber by passing through the cap *f*, with its outer end provided with an elongation-groove, *g*, in which the short end *h* of the bell-crank is placed, and by which the said end *h* can move in either direction a certain distance without operating the valve. The cap *f* is attached by being threaded into the casing, or otherwise, and it is provided with a projection, *i*, that forms a bearing for the stem *e'*. This bearing is vertically slotted to permit the end *h* of the bell-crank to pass to and act on the stem *e'*. The bell-crank is pivoted to the casing of the ejector at *k*, with its long end *h'* secured to the float-ball E, by which the valve *e* is moved positively a certain distance by the float and arm K, and through the remainder of its throw is moved quickly or instantaneously by the pressure of the fluid.

To prevent the water that the discharge-pipe contains just after the ejector ceases to act from running back into the well, and in case the pressure-water at different periods is not of a sufficient head to accomplish the ejection of the static water when the well has filled and the valve *e* is opened thereby, I arrange a valve at the inlet of the passage *a*, to automatically close and open, as may be desired, the same consisting of a casing, F, secured over the opening, in which is placed the disk *l*, that is seated downwardly by the weight of any accumulated water in the ejector, and which is lifted and seated against the opening of the passage *a* when the vacuum is formed by the ejector being put in operation. The static water then passes into the passage *a* through the hole *m*, thereby permitting the static water from the well to be ejected, and that contained in the pipe or ejector is prevented from passing back into the well.

In the operation, when the well has filled to a certain height with water, the float E brings the short end *h* of bell-crank in contact with the outer end of the groove *g*, which draws the stem and head *e* outward, thereby permitting the water in the pressure-pipe D to pass to the ejector, thus putting the same in operation and forcing and holding the head *e* against the cap *f* until nearly all the static water has been ejected, or until the float places the end *h* of the bell-crank against the end of the groove *g*, and thereby moving the head inward, which, after it has moved a certain distance, is by the pressure-water forwarded and firmly seated over the port *c*, thereby quickly seating and unseating the said head, which results in applying and cutting off the pressure-water, as desired, when the well A has filled or emptied.

I claim as my invention—

1. In combination with an ejector, B, and the pressure-pipe D, the piston-head *e*, placed in relation with the two, that forms a cut-off valve which is moved positively a certain distance by the float and arm K, and through the remainder of its throw is moved quickly or instantaneously by the fluid-pressure.

2. The combination of the ejector B, the discharge-pipe C, the pressure-pipe D, and the piston-head *e*, arranged to form a cut-off and be held open or closed by the pressure of the fluid in the pipe D when placed in either position, as specified.

3. The combination of the ejector B, the pipes C and D, the piston-head *e*, arranged to be positively moved a certain distance by the float E and arm K, and through the remainder of the stroke quickly moved either way by the pressure of the fluid, the stem *e'*, the float E, and the bell-crank connected to the float and stem *e'*, as set forth.

4. In an apparatus for draining cellars, the combination, with pressure and discharge pipes and with an ejector and suction pipe between the two, said suction-pipe extending into the cellar to be drained and provided with a valve adapted to allow the discharge of the liquid, but to prevent the admission thereof into the cellar, of a valve in the pressure-pipe and operating mechanism therefor, substantially as shown, whereby the said valve is opened by the rising of the water and closed by the falling of the same in the cellar, substantially as described.

CHARLES WHITE.

Witnesses:
WILLIAM H. BERRY,
MURRAY HANSON.